(12) United States Patent
Koikawa

(10) Patent No.: US 11,379,202 B2
(45) Date of Patent: Jul. 5, 2022

(54) SYSTEM, INFORMATION PROCESSING METHOD, AND PROGRAM FOR DIRECTLY EXECUTING ARITHMETIC LOGIC ON VARIOUS STORAGES

(71) Applicant: TONOI CO., LTD., Tokyo (JP)

(72) Inventor: Mitsuo Koikawa, Tokyo (JP)

(73) Assignee: TONOI CO., LTD., Tokyo (JP)

( * ) Notice: Subject to any disclaimer, the term of this patent is extended or adjusted under 35 U.S.C. 154(b) by 0 days.

(21) Appl. No.: 17/270,182

(22) PCT Filed: Aug. 23, 2019

(86) PCT No.: PCT/JP2019/032996
§ 371 (c)(1),
(2) Date: Feb. 22, 2021

(87) PCT Pub. No.: WO2020/045269
PCT Pub. Date: Mar. 5, 2020

(65) Prior Publication Data
US 2021/0326123 A1    Oct. 21, 2021

(30) Foreign Application Priority Data

Aug. 28, 2018 (JP) .............................. JP2018-159325
Feb. 14, 2019 (JP) .............................. JP2019-024419

(51) Int. Cl.
*G06F 8/41* (2018.01)
*G06F 8/20* (2018.01)
(Continued)

(52) U.S. Cl.
CPC ................ *G06F 8/451* (2013.01); *G06F 8/24* (2013.01); *G06F 8/63* (2013.01); *G06F 9/547* (2013.01)

(58) Field of Classification Search
None
See application file for complete search history.

(56) References Cited

U.S. PATENT DOCUMENTS

2002/0144086 A1* 10/2002 Tanaka .................... G06F 9/461
   712/35
2011/0131293 A1* 6/2011 Mori ........................ G06F 8/63
   709/217
(Continued)

FOREIGN PATENT DOCUMENTS

JP    2000-122871 A    4/2000

OTHER PUBLICATIONS

International Search Report for International Application No. PCT/JP2019/032996 dated Nov. 5, 2019 (2 sheets, 1 sheet translation, 3 sheets total).

(Continued)

*Primary Examiner* — Qing Chen
(74) *Attorney, Agent, or Firm* — Kratz, Quintos & Hanson, LLP

(57) ABSTRACT

Provided are a system, an information processing method, and a program capable of improving a speed of information processing without using an intermediate code or the like even in a case where a plurality of heterogeneous devices are used. A system 1 includes: a source acquisition part 200 that acquires a source code; an arithmetic logic identification part 202 that identifies an arithmetic logic from the source code by using a predetermined API; an arithmetic logic supply part 208 that supplies the arithmetic logic to a compiler of a processor designated on the basis of the source code; a correspondence table creation part 210 that, when an object storage 400 stores a result obtained by compiling of the compiler of the designated processor as an execution image, creates a processor correspondence table in which a path to the execution image, which is stored in the object storage 400, in the designated processor is associated with the designated processor and stores the processor correspondence table in the object storage 400; and a correspondence relation determination part 212 that stores a correspondence (Continued)

relation, in which the arithmetic logic supplied by the arithmetic logic supply part 202 is associated with a storage path of the processor correspondence table stored in the object storage 400, in the object storage 400.

12 Claims, 7 Drawing Sheets

(51) Int. Cl.
 *G06F 8/61* (2018.01)
 *G06F 9/54* (2006.01)

(56) References Cited

U.S. PATENT DOCUMENTS

| | | | |
|---|---|---|---|
| 2011/0157195 A1* | 6/2011 | Sprangle | G06F 9/3836 |
| | | | 345/522 |
| 2013/0007708 A1* | 1/2013 | Sakaki | G06F 8/10 |
| | | | 717/120 |
| 2016/0261526 A1* | 9/2016 | Kodama | H04L 49/3018 |

OTHER PUBLICATIONS

Written Opinion of the International Searching Authority for International Application No. PCT/JP2019/032996 dated Nov. 5, 2019 (4 sheets).

\* cited by examiner

FIG. 7(a)

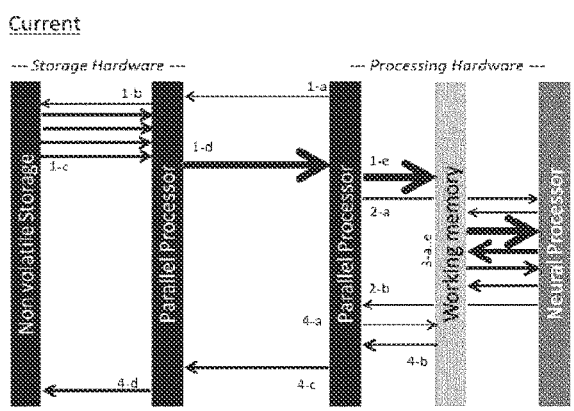

Current 1-a. matrix data query via object storage
1-b. matrix date query to NVMe
1-c. matrix data body from NVMe
1-d. matrix data body via object storage
1-e. matrix data body to DRAM
2-a. Deep learning task issue
3-a..e. Processing deep learning w/ shrinking data size
2-b. Deep learning task finish
4-a..d. Deep learning result save to NVMe via object storage

FIG. 7(b)

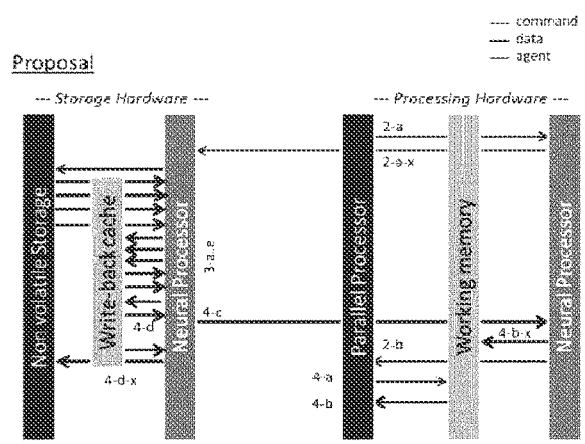

Proposal 2-a. Deep learning task issue
2-a-x. send Deep learning assemble image to distributed processor
3-a..e. Processing deep learning w/ shrinking data size via parallel stream
4-d. Deep learning result
4-c. Deep learning result via RDMA
4-b-x Deep learning result to DRAM
4-d-x Deep learning result to NVMe
2-b. Deep learning task finish
4-a..b. Deep learning result query and reply

SYSTEM, INFORMATION PROCESSING METHOD, AND PROGRAM FOR DIRECTLY EXECUTING ARITHMETIC LOGIC ON VARIOUS STORAGES

TECHNICAL FIELD

The present invention relates to a system, an information processing method, and a program. In particular, the present invention relates to a system, an information processing method, and a program capable of directly executing arithmetic logic on various storages.

BACKGROUND ART

Conventionally, a load distribution system equipped with a plurality of computers distributes jobs to the plurality of computers and has the computers execute the jobs. The load distribution control system includes: a storage to be accessed by the plurality of computers to execute the jobs; a first management device that makes a computer, which has a lower load from among the plurality of computers, execute the jobs; a second management device that accepts a plurality of jobs, queues the plurality of accepted jobs, and stores the jobs sequentially in a first job queue; a third management device that sequentially fetches the jobs in the first job queue and executes data processing necessary for the execution of the fetched jobs by the computer on the storage unit; and a second job queue that sequentially stores the jobs for which the data processing has finished as waiting jobs which wait to be executed by the computer. The first management device sequentially fetches the plurality of jobs from the second job queue and has the computer execute the fetched jobs (for example, Patent Literature 1). According to the load distribution system described in Patent Literature 1, a processing time for executing a job can be shortened by maximizing the computing power.

CITATION LIST

Patent Literature

Patent Literature 1: JP 2008-15888 A

SUMMARY OF INVENTION

Technical Problem

In the conventional load distribution system as described in Patent Literature 1, the data processing efficiency is lowered depending on the data division size of the processing target. For example, in the conventional load distribution system, data is supplied from storage to a computer processor to execute a job. Thus, in a large amount of continuous data of several gigabytes or more, data processing efficiency is significantly reduced regardless of whether data divided into about several kilobytes is used.

Therefore, an object of the present invention is to provide a system, an information processing method, and a program in which data processing can be directly executed on various storages to prevent data processing efficiency from being reduced in a case where a large amount of continuous data of several gigabytes or more is used.

Solution to Problem

In order to achieve the above object, the present invention provides a system which includes a user application stored in an object storage and having a predetermined arithmetic logic in a source code and enables predetermined processing to be performed on predetermined data by causing at least one of a plurality of heterogeneous devices to execute the arithmetic logic. The system includes: a source acquisition part that acquires the source code; an arithmetic logic identification part that identifies the arithmetic logic from the source code by using a predetermined application programming interface (API); an arithmetic logic supply part that supplies the arithmetic logic to a compiler of a processor designated on the basis of the source code; a correspondence table creation part that, when the object storage stores a result obtained by compiling of the compiler of the designated processor as an execution image, creates a processor correspondence table in which a path to the execution image, which is stored in the object storage, in the designated processor is associated with the designated processor and stores the processor correspondence table in the object storage; and a correspondence relation determination part that stores a correspondence relation, in which the arithmetic logic supplied by the arithmetic logic supply part is associated with a storage path of the processor correspondence table stored in the object storage, in the object storage.

Advantageous Effects of Invention

According to the system, the information processing method, and the program according to the present invention, a system, an information processing method, and a program can be provided in which data processing can be directly executed on various storages to prevent data processing efficiency from being reduced in a case where a large amount of continuous data of several gigabytes or more is used.

BRIEF DESCRIPTION OF DRAWINGS

FIG. 7(a) is a schematic diagram of a conventional Apache Spark operation, and FIG. 7(b) is a schematic diagram of an operation in a system according to another example of this embodiment.

DESCRIPTION OF EMBODIMENTS

Embodiment

<Outline of System 1>

Figure 1:
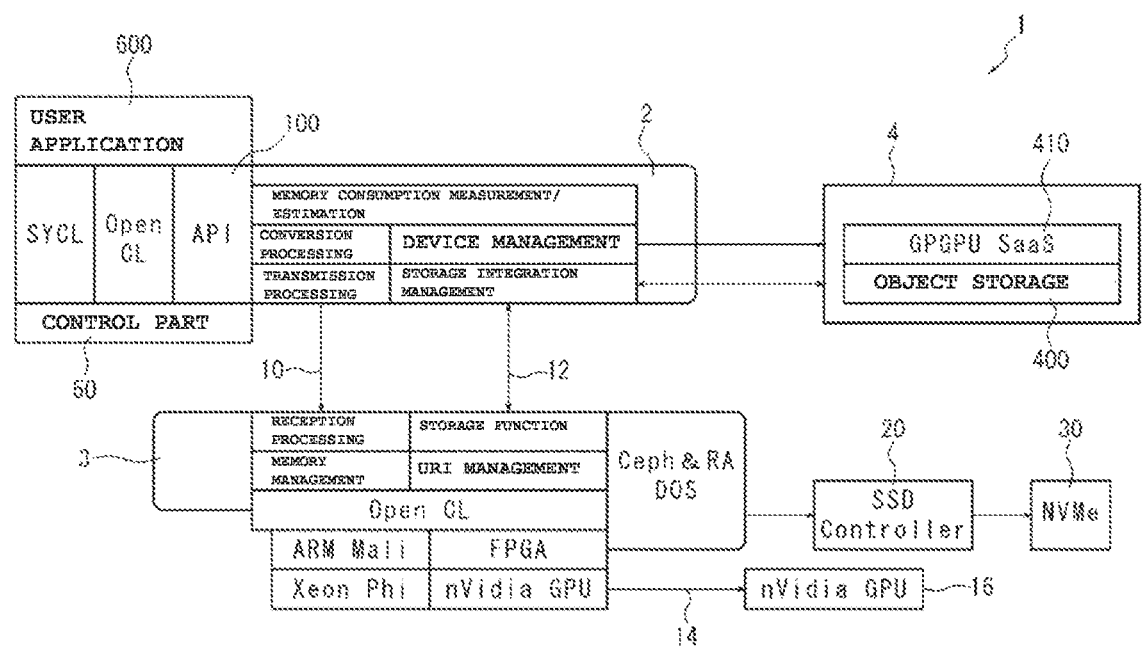
FIG. 1 is a schematic diagram of an architecture of a system according to this embodiment.

In a conventional load distribution system, data is read from one or more storages, and distributed processing is performed using a plurality of processors. That is, data is supplied from a predetermined storage to a processor of a predetermined computer to execute a job. Therefore, in the case of handling a small amount of data of about several kilobytes (for example, the case of handling big data), data processing efficiency is hardly reduced even in the conventional load distribution system. However, in the case of handling a large amount of continuous data of several gigabytes or more, the data processing efficiency is significantly reduced in the conventional load distribution system. That is, in the conventional load distribution system (for example, the system described in JP 2008-15888 A), a predetermined computer reads data from the storage, and further, the data read by the computer is read continuously by another computer to execute a job. Thus, the data processing efficiency in the case of handling a large amount of data is significantly reduced.

In this regard, the present inventor changed his way of thinking and came up with the idea of reversing the data supply direction (that is, the supply direction of a routine or a job). For example, the present inventor realized that by supplying a routine or a job from a user application to a predetermined computer, and supplying the routine or the job from the computer to a storage to directly process the routine or the job on the storage, data processing efficiency could be improved. That is, the system according to the present invention has a configuration in which the execution code of the routine which handles the data in the user application is supplied to the IO controller on the storage, and the data processing is directly executed on the storage. The system is a system in which distributed processing is performed simultaneously on both the cloud where the user application operates and the edge where the routine is executed.

Conventionally, it was necessary to generate an intermediate code used in conventional virtual hardware or the like in order to support various heterogeneous devices handled at the edge. However, according to the configuration conceived by the present inventor, the intermediate code is not necessarily required, and the execution code for predetermined data processing can be generated in the cloud (incidentally, the execution code can be stored in the cloud). Thus, the execution code (that is, a job/routine for storage) with higher processing efficiency than the intermediate code can be cut out from the user application on the cloud, and data processing can be executed directly on the storage.

Incidentally, in a case where each processor of a plurality of devices (incidentally, the device includes storages) executes a predetermined arithmetic logic, the machine language differs depending on the type of the device, so that even when the arithmetic logic can be executed on one device, it does not necessarily mean that the logic can be executed on another device. Therefore, conventionally, virtual hardware is defined, and the arithmetic logic is compiled into intermediate code executed by the virtual hardware so that the arithmetic logic operates on a heterogeneous device. That is, the processors of various heterogeneous devices implement a virtual machine which realizes virtual hardware, and the virtual machine reads the intermediate code and executes the arithmetic logic.

However, in such a method, the processing speed is reduced by the amount of passing through the virtual machine. Therefore, in the conventional method, the processing speed is increased by using a specific compiler (for example, a Just-in-time (JIT) compiler) which converts all the intermediate codes into machine language for the processor before executing the arithmetic logic. However, even with such a method, there is a limit to speeding up since the intermediate code is required.

On the other hand, according to the configuration conceived by the present inventor, in a case where a user application having a predetermined arithmetic logic in a source code is used, the arithmetic logic is held in the cloud as the source code, in each of the processors of a plurality of devices, an execution image is created in advance by compiling the arithmetic logic for the plurality of devices, the created execution image is stored in the cloud, and when the execution instruction of the arithmetic logic is given, the stored execution image can be downloaded to the device and executed.

Therefore, the system 1 according to this embodiment in which the data supply direction is reversed from that of the conventional format includes a user application which is stored in the object storage and has a predetermined arithmetic logic in the source code and is a system which enables at least one of a plurality of heterogeneous devices to execute the arithmetic logic to perform predetermined processing on a predetermined data. Then, the system 1 according to this embodiment holds the arithmetic logic as the source code. In the system (which hereinafter may be referred to as an "execution image supply system"), in each of the processors of the plurality of devices, an execution image is created by compiling the arithmetic logic for the plurality of devices, the created execution image is stored in the object storage, and in a case where the arithmetic logic is called to one device of the plurality of devices, the execution image created for the one device is supplied from the object storage to the one device and is executed.

According to the system 1 according to this embodiment, even in a case where a large amount of continuous data of several gigabytes is used, the arithmetic processing can be executed directly on the storage, so that the data processing efficiency can be significantly improved as compared with the conventional technique. Further, according to the system 1, the processing speed is significantly improved since the system does not pass through a virtual machine. Further, according to the system 1 according to this embodiment, for example, the overhead in Java (registered trademark) or the like can be eliminated. Thus, the processing speed can be further improved, and the functions of the hardware can be fully utilized.

<Details of System 1>

FIG. 1 illustrates an example of an outline of an architecture of a system according to the embodiment of the present invention. Further, FIG. 2 illustrates an example of an outline of a functional configuration of the system according to the embodiment of the present invention.

[Outline of Architecture of System 1]

Figure 2:
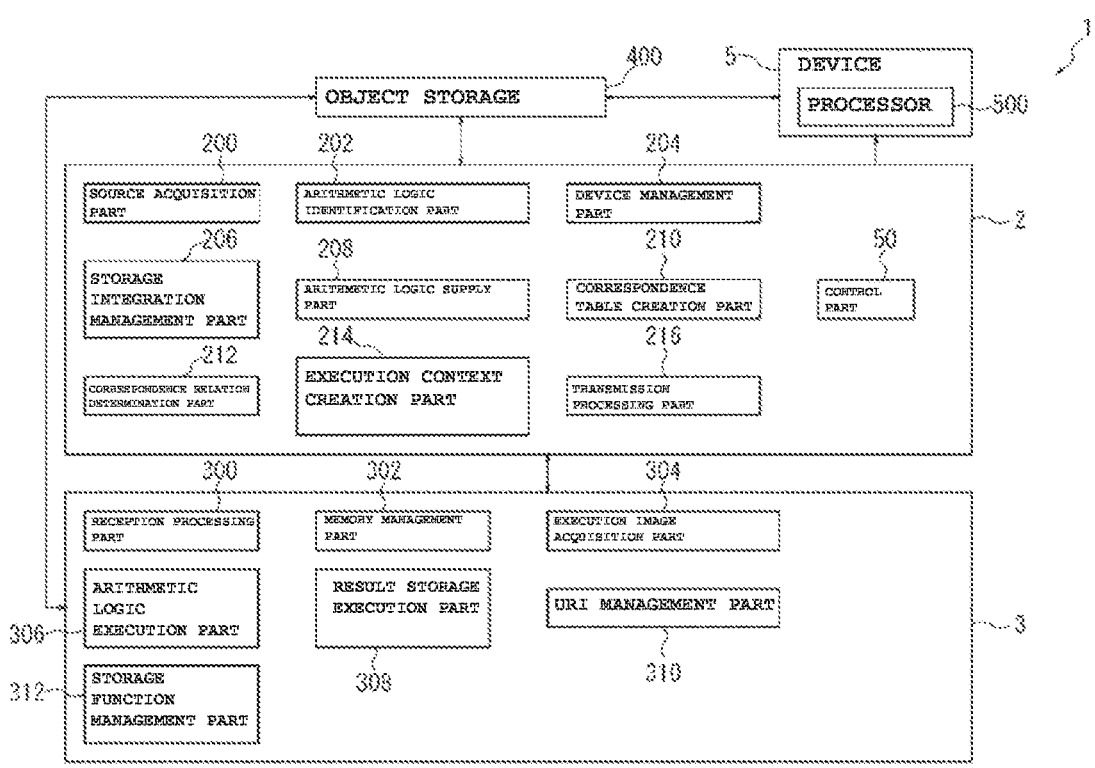
FIG. 2 is a function configuration block diagram of the system according to this embodiment.

As illustrated in FIGS. 1 and 2, the system 1 according to this embodiment includes a proxy side system 2, a stub side system 3, and a user application 600 which is stored in an object storage 400 and called to the system 1 (specifically, the proxy side system 2) and enables at least one of a plurality of heterogeneous devices 5 to execute arithmetic logic to perform predetermined processing on a predetermined data. The user application 600 has a predetermined arithmetic logic in a source code.

Incidentally, although only one device 5 is illustrated in FIG. 2 for simplification of the explanation, a plurality of devices 5 may exist, and the plurality of devices 5 may be devices operating in different machine languages. The device 5 is, for example, an IO controller which controls various storage devices or recording devices (that is, storage), and peripheral devices by connecting the devices to a control part or a processor. Further, the user application 600 is exemplified by an application which executes various processes, and examples thereof include various utility applications, various calculation applications, image processing applications of still images and moving images, and programming applications.

As illustrated in FIG. 1, the proxy side system 2 has a control part 50 and has a function (memory consumption measurement/estimation function) of measuring or estimating the amount of memory consumed by the stub side system 3, a function (conversion processing function) of storing an execution image obtained by supplying a predetermined arithmetic logic to each processor of a plurality of heterogeneous devices and compiling the logic in the object storage 400 or a GPGPU SaaS 410, a function (device management function) of managing whether or not an execution image has already been created for any device of a plurality of devices, a function (transmission processing function) of supplying predetermined information to the stub side system 3 by using a queue 10 or the like, and a function (storage integration management function) of checking whether or not an invalid syntax exists in the data access from the arithmetic logic to the storage part such as the object storage 400. In the user application 600 read by the proxy side system 2, processing such as identification of arithmetic logic is performed by a predetermined Application Programming Interface (API) 100. Then, the system 1 can also convert the arithmetic logic into a format which can be executed by the control part 50 by using a language such as SYCL and OpenCL. Incidentally, the object storage 400 and the GPGPU SaaS 410 are Public PaaS 4.

The stub side system 3 has a function (reception processing function) of receiving information from the proxy side system 2, a function (storage function) of managing a storage, a function (memory management function) of preparing an environment in which an arithmetic logic is executed, and a function (URI management function) of managing a Uniform Resource Identifier (URI). The stub side system 3 is a device which causes an execution destination (for example, a device such as ARM Mali, FPGA, Xeon Phi, and nVidia GPU. Incidentally, an nVidia GPU 16 receives information from the stub side system 3 via the dedicated bus 14) to execute an arithmetic logic on the basis of the information received from the proxy side system 2. For example, in the execution environment prepared by the memory management function, the stub side system 3 causes the execution destination device to execute the processing based on the arithmetic logic on the basis of the execution image received by the reception processing function by using OpenCL, Ceph, RADOS, and the like. Examples of the execution destination device include an SSD, and the SSD is controlled by an SSD controller 20. Further, arithmetic results and the like can be supplied from the SSD to a logical device based on NVM Express (NVMe30). Incidentally, the proxy side system 2 and the stub side system 3 can exchange data with each other by, for example, distributed storage software (Ceph12).

[Outline of Method of Designating Data Used in System 1]

First, in the system 1 according to this embodiment, it is preferable to adopt a specific designation method as a data designation method.

That is, a conventional computer program is operated in such a manner that a plurality of routines pass physical addresses called pointers, and data on a dynamic random access memory (DRAM) is used or processed in common among a plurality of routines. Therefore, it is necessary to transfer data in the lower layer of the memory hierarchy such as a solid state drive (SSD) to the DRAM once. Herein, when the amount of data handled between the DRAM and the SSD increases, the conventional method cannot secure a sufficient transfer rate, and the data transfer to the DRAM becomes a bottleneck of data processing.

In this regard, in the system 1, from the viewpoint of eliminating the bottleneck, it is preferable to use the management by the uniform resource identifier (URI) instead of the management by the physical address. That is, the system 1 includes the control part 50 and a storage part (for example, a DRAM, an SSD, and an object storage 400) which stores data at an address indicated by a data position (for example, a physical address, addresses of various storage parts, and an IO controller number).

In the system 1, as a pointer for accessing data, a URI is used in which a predetermined scheme is associated with a resource in a format defined for each scheme after a predetermined delimiter (for example, ":" (colon)). That is, in the system 1 according to this embodiment, the position of data that can be processed by the control part 50 is "extended" when a pointer indicating a data position inside a computer is changed or substituted from a physical address to a URI. In other words, the system 1 uses the URI instead of the data position. Incidentally, the pointer is a tag used when the computer program passes the position of data to be processed between routines.

(Control Part 50)

The control part 50 controls various kinds of data processing and the like in the proxy side system 2 of the system 1. The control part 50 operates the storage part to execute the transferring, processing, or the like of the data stored in the storage part and the control of a predetermined application (for example, the user application 600). For example, the control part 50 is configured to include a logic circuit of a central processing unit (CPU).

The control part 50 controls and activates the predetermined application designated by the scheme associated with the URI. Then, the control part 50 passes the resource of the URI to the application. Subsequently, the application controls the data designated by the URI and stored in the storage part by using the URI as the data position on the basis of the resource. Incidentally, the control part 50 can also control and activate a plurality of applications on the basis of the scheme associated with the URI.

Incidentally, the URI is an identifier which indicates a resource in a predetermined certain format. In the URI according to this embodiment, the resource for enabling access by the control part 50 or the application can be indicated in consideration of a case where target data does not exist in the system 1. Further, in order that the control part 50 and the application can be allowed to access the resource indicated by the URI, it is necessary to convert the URI to a physical address in the actual storage part. Thus, the same physical address may be indicated by a plurality of URIs. Incidentally, the conversion or substitution of a URI into a physical address is executed by the application designated by the scheme associated with the URI.

For example, the URI is described in a format of "scheme://resource", and the resource is described in a format defined for each scheme. Then, examples of the resource include "disk number, directory, file, seek in which target data exists", "DRAM memory address in which target data exists", and "correspondence, retry, call back when target data does not exist".

(Storage Part)

The storage part is provided to be able to store predetermined data at a data position of a predetermined format. As long as the storage part has a function of storing various kinds of data, various storage media may be used as the storage part. The examples thereof include a register, a cache, a dynamic random access memory (DRAM), a video memory, a solid state drive (SSD), and a hard disk drive (HDD), a tape drive, an optical recording medium such as a compact disc (CD) and a digital versatile disc (DVD), an optical magnetic storage medium, and a magnetic recording medium. The storage part may be a storage part on a cloud or may be an object storage part which is suitable for storing a large amount of data without a storage limit of data size or the number of pieces of data and stores the data in object units. Data positions of different formats are assigned to these storage parts.

As an example, in the register, the cache, and the DRAM, the data position is designated using a physical address. Specifically, in the register, the data position is designated by the register name or number. In the cache, the data position is designated by the address counted along the permutation from the beginning. Also in the DRAM, the data position is designated by the address counted along the permutation from the beginning. However, in the DRAM, the designation of the data position is physically different from the cache.

[Details of Data Designation Method of System 1]

The system 1 according to this embodiment includes the storage part in which data is designated by a URI. Then, the control part 50 activates the application according to the scheme associated with the URI, and the resource of the URI is passed to the activated application. Then, the application converts the URI into a data position on the basis of the passed resource. Accordingly, the control part 50 can control the storage part directly and uniformly regardless of the type of the storage part.

For example, the conventional CPU directly controls the register, the cache, and the DRAM. Further, the conventional CPU cannot directly control the storage parts below the SSD in the memory hierarchy. Since the transfer rate in the path for transferring data from the DRAM to the SSD is slower than the transfer rate in the storage part of the DRAM or higher in the memory hierarchy, the data transfer from the DRAM to the SSD becomes a bottleneck in terms of transfer rate no matter how fast the data transfer in the DRAM or higher is. This is because in the conventional computer, a different format is used for each storage part, and the data position is designated by the physical address.

On the other hand, the system 1 according to this embodiment uses the URI as a pointer instead of the physical address. Therefore, the control part 50 can directly control the SSD or the like which is a storage part in the lower layer than the DRAM. Specifically, in the control part 50 according to this embodiment, in a case where the control part 50 accesses each storage part, the range accessible by the command of the control part 50 is the register, the cache, the DRAM, the IO controller of the IO channel, and the like. Then, the control part 50 controls numerical values such as data positions held in the register, the cache, the DRAM, and the IO controller of the IO channel, the numerical values held in the IO controller are rewritten by the control part 50, and thus the storage parts such as the SSD, the HDD, and the tape drive ahead of the IO controller are directly controlled by the control part 50.

As a result, for example, the DRAM can be handled not as a data transfer destination/shared location but as a cache having a larger capacity than the cache, so that the data processing speed in the system 1 can be improved significantly.

More specifically, the control part 50 refers to the URI of predetermined data stored in, for example, the object storage 400 and activates the application designated by the scheme associated with the URI. The control part 50 passes the resource behind the delimiter of the URI to the application. On the basis of the resource, the application uses the URI as the data position instead of the physical address and accesses the data stored in the storage part designated by the URI. Accordingly, the control part 50 can centrally manage access to the SSD and the like using the URI.

For example, if the application activated by the control part 50 is an SSD control routine, the SSD control routine generates the physical address of the SSD controller device or the physical address of the SSD memory space on the SSD controller on the basis of the resource. As a result, the control part 50 can control the SSD.

Incidentally, the application can also designate the data stored in each of the plurality of storage parts on the basis of the URI. That is, the application is controlled by the control part 50, and each of a plurality of pieces of data stored in the plurality of storage parts at the positions/addresses designated by physical addresses of different formats can be handled uniformly by using the URI. Accordingly, according to the system 1 of this embodiment, the designation of the data position among the plurality of storage parts can be extended by the URI and, as a result, can be handled uniformly.

In the following, a configuration suitable for the execution image supply system which is the system 1 according to this embodiment will be mainly described.

As illustrated in FIG. 2, the system 1 according to this embodiment generally includes the proxy side system 2 and the stub side system 3. The system 1 stores predetermined information in the object storage 400 outside the system 1. Then, the system 1 can cause the predetermined device 5 to execute predetermined processing. That is, the system 1 includes a user application which is stored in the object storage 400 and has a predetermined arithmetic logic in the source code and is a system which enables at least one of a plurality of heterogeneous devices 5 to execute the arithmetic logic to perform predetermined processing on a predetermined data. Incidentally, the device 5 has one or more processors 500 which control the operation of the device 5.

[Proxy Side System 2]

The proxy side system 2 is a system which performs predetermined processing on a predetermined user application before compiling the predetermined user application with a commonly used compiler.

The proxy side system 2 has a source acquisition part 200 which acquires a source code, an arithmetic logic identification part 202 which identifies an arithmetic logic in the source code, a device management part 204 which manages one or more devices 5, a storage integration management part 206 which executes the processing relating to data access by the arithmetic logic, an arithmetic logic supply part 208 which supplies the arithmetic logic to one or more devices 5, a correspondence table creation part 210 which creates a processor correspondence table obtained by associating a path to an execution image with a processor 500 which executes the execution image, a correspondence relation determination part 212 which determines the correspondence relation in which a storage path of the processor correspondence table is associated with the arithmetic logic which uses the processor correspondence table, an execution context creation part 214 which creates an execution context, a transmission processing part 216 which supplies predetermined information to the stub side system 3, and a control part 50 which controls the operation of each configuration of the proxy side system 2.

(Source Acquisition Part 200)

The source acquisition part 200 acquires the source code of a predetermined application (for example, the user application 600). Herein, the predetermined application is stored in the object storage 400, and the source acquisition part 200 acquires the source code of the predetermined application from the object storage 400. That is, the source code is stored in the object storage 400, that is, a cloud, and the source acquisition part 200 acquires the source code from the cloud. Incidentally, the application has an arithmetic logic in the source code. The source acquisition part 200 reads the source code of the predetermined application and supplies the read source code to the arithmetic logic identification part 202.

(Arithmetic Logic Identification Part 202)

The arithmetic logic identification part 202 calls a predetermined application programming interface (API), and the API identifies the arithmetic logic from the source code. In this embodiment, the arithmetic logic is preferably used for distributed processing.

(Device Management Part 204)

The device management part 204 checks whether or not the processor 500 designated on the basis of the source code is a usable processor which can be used in the system 1. That is, the device management part 204 checks whether or not the processor 500 designated by the source code is an associated processor in the system 1. The device management part 204 supplies the check result to the arithmetic logic supply part 208.

(Storage Integration Management Part 206)

The storage integration management part 206 checks whether or not access to other data other than predetermined data from the arithmetic logic identified by the arithmetic logic identification part 202 exists. For example, the storage integration management part 206 checks whether or not an invalid URI syntax exists in the identified arithmetic logic. Further, the storage integration management part 206 can check whether or not the access right to the data to be accessed exists in the system 1. In this case, only for the data for which the access right exists in the system 1, the storage integration management part 206 permits access to the data from the arithmetic logic.

Herein, in a case where it is determined that no access to other data in the storage integration management part 206 exists, the device management part 204 checks whether or not the processor 500 which is designated on the basis of the source code is a usable processor which can be used in the system 1.

(Arithmetic Logic Supply Part 208)

FIG. 3 illustrates an outline of a configuration of a user application, a processor correspondence table, and a correspondence relation according to this embodiment.

Figure 3A:
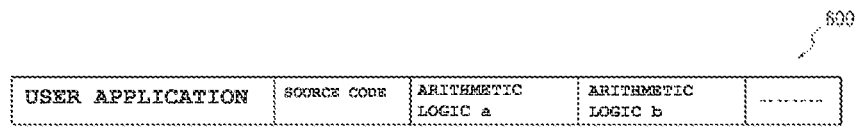
FIG. 3 is a schematic diagram of a configuration of a user application, a processor correspondence table, and a correspondence relation according to this embodiment.

As illustrated in FIG. 3(a), the user application 600 is configured to have a source code including one or more arithmetic logics (for example, arithmetic logic a, arithmetic logic b, etc.). The source code can also include data accessed by the arithmetic logic and information which identifies or designates the device 5, the processor 500, or the like on which the arithmetic logic is executed.

The arithmetic logic supply part 208 supplies an arithmetic logic to the compiler of the processor 500 designated on the basis of the source code. More specifically, in a case where it is confirmed that a processor usable by the device management part 204 exists (that is, a case where it is confirmed that the designated processor 500 is a usable processor), the arithmetic logic supply part 208 supplies the arithmetic logic in the source code of the user application 600 to the usable processor. Herein, there may be a plurality of processors 500 designated on the basis of the source code. That is, there may be a plurality of devices 5 designated on the basis of the source code. In this case, the arithmetic logic supply part 208 supplies the arithmetic logic to each of the compilers of a plurality of designated processors.

The processor 500 supplied with the arithmetic logic compiles the received arithmetic logic by using the compiler of the processor 500. The compiling of the compiler of the processor 500 is executed on the cloud. Then, the processor 500 stores the compiled result as an execution image in the object storage 400. In a case where there are a plurality of processors to which the arithmetic logic is supplied, each of the plurality of processors compiles the received arithmetic logic and stores each of the execution images resulting from the compilation in the object storage 400. Incidentally, a conventionally known compiler may be used as the compiler of the processor. Further, the execution image can be created by using, for example, the Kernel Image of OpenCL.

(Correspondence Table Creation Part 210)

In a case where the object storage 400 stores the result obtained by the compiling of the compiler of the processor 500 designated on the basis of the source code as an execution image, the correspondence table creation part 210 creates a processor correspondence table 610 in which a path to the execution image stored in the object storage 400 in the designated processor 500 is associated with the designated processor.

Figure 3B:
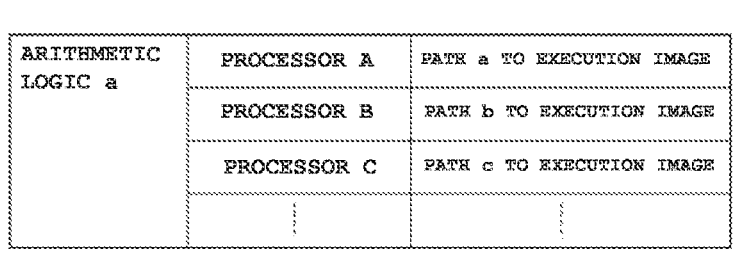

Since the user application 600 can have a plurality of arithmetic logics, a processor is associated with the path of the execution image for the processor in each arithmetic logic. Specifically, as illustrated in FIG. 3(b), the processor correspondence table 610 is a table in which each of one or more processors is associated with the path to the execution image which is the result obtained by the compiling of the compiler of each processor in each arithmetic logic, and the object storage 400 stores the data related to this table as the processor correspondence table 610. In the example of FIG. 3(b), the processor A supplied with arithmetic logic a is associated with path a to the execution image created by the compiling of the compiler of the processor A (the same applies to the processor B, the processor C, and the like). The correspondence table creation part 210 stores the created processor correspondence table in the object storage 400. Incidentally, the processor correspondence table 610 may be a separate table for each arithmetic logic or may be the same table.

(Correspondence Relation Determination Part 212)

Figure 3C:
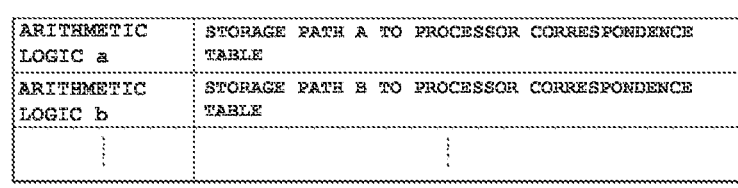

The correspondence relation determination part 212 stores the correspondence relation 620 in which the arithmetic logic supplied by the arithmetic logic supply part 208 is associated with the storage path of the processor correspondence table which is stored in the object storage 400 and corresponds to the arithmetic logic in the object storage 400. As illustrated in FIG. 3(c), the correspondence relation 620 is a table in which an arithmetic logic is associated with the storage path to the processor correspondence table 610 which is created in the processor supplied with the arithmetic logic and stores the path to the execution image. In the example of FIG. 3(c), arithmetic logic a is associated with storage path A to the processor correspondence table (the same applies to other arithmetic logic such as arithmetic logic b).

(Execution Context Creation Part 214)

The execution context creation part 214 creates an execution context to be executed in the arithmetic logic. Specifically, the object storage 400 stores the device information regarding a plurality of heterogeneous devices in advance. For example, the device information is information regarding the position and type of the device, the type of the processor 500, and the like. Then, in a case where the execution of the user application 600 is started, the user application 600 designates the data to be accessed by the arithmetic logic of the user application 600 and designates the device on which the arithmetic logic is executed. Then, the execution context creation part 214 creates an execution context on the basis of the designated data.

More specifically, first, in a case where the user application 600 designates the data, the storage integration management part 206 checks whether or not the system 1 has the access right to the designated data, that is, the data for which access is requested, and in a case where the system 1 has the access right, the designation of the data is allowed.

Then, the device management part 204 acquires the device information regarding the device designated by the user application 600 from the object storage 400 and identifies the target processor on which the data processing is executed. Subsequently, the execution context creation part 214 refers to the processor correspondence table and the correspondence relation stored in the object storage 400 and writes the path to the execution image associated with the target processor in the processor correspondence table associated with the arithmetic logic in the execution context. Accordingly, the execution context creation part 214 creates the execution context to be provided to the outside.

(Transmission Processing Part 216)

In a case where the user application 600 instructs the execution of the arithmetic logic, the transmission processing part 216 writes the execution context in which the path is written in the storage queue in order to supply the execution context to the outside (that is, the stub side system 3). The transmission processing part 216 supplies the execution context to the stub side system 3 via the storage queue.

[Stub Side System 3]

The stub side system 3 causes a predetermined device 5 to execute predetermined processing on the basis of the execution context supplied from the proxy side system 2. Incidentally, the result of the executed processing can be stored in the object storage 400.

The stub side system 3 has a reception processing part 300 which receives predetermined information from the proxy side system 2, a memory management part 302 which manages a physical memory, an execution image acquisition part 304 which acquires an execution image, an arithmetic logic execution part 306 which executes an arithmetic logic, a result storage execution part 308 which stores the result of the arithmetic logic in the object storage 400, a URI management part 310 which manages a URI, and a storage function management part 312 which manages a storage function.

(Reception Processing Part 300)

The reception processing part 300 receives the execution context in which the path is written from the transmission processing part 216. Further, the reception processing part 300 decodes the received execution context.

(Memory Management Part 302)

The memory management part 302 prepares an execution environment of a physical memory or the like in which arithmetic logic is executed on the basis of the device information in the execution context decoded by the reception processing part 300.

(Execution Image Acquisition Part 304)

The execution image acquisition part 304 acquires an execution image from the object storage 400 on the basis of the path to the execution image in the execution context decoded by the reception processing part 300. That is, the execution image acquisition part 304 downloads the execution image designated by the decoded execution context from the object storage 400.

(Arithmetic Logic Execution Part 306)

The arithmetic logic execution part 306 sets the data designated in the execution context decoded by the reception processing part 300 as an argument. Then, the arithmetic logic execution part 306 executes the arithmetic logic by using the execution image in the execution environment prepared by the memory management part 302.

(Result Storage Execution Part 308)

The result storage execution part 308 stores the result obtained by executing the arithmetic logic in the arithmetic logic execution part 306 in the object storage 400. The result stored in the object storage 400 can be used for various purposes such as output from a predetermined output device and reuse for other information processing.

(URI Management Part 310)

In the result obtained by executing the arithmetic logic in the arithmetic logic execution part 306, the URI management part 310 distributes the access destination of the device which requires the result.

(Storage Function Management Part 312)

The storage function management part 312 controls and manages the storage of information in the object storage 400 and/or the local storage (for example, a predetermined storage part (not illustrated) provided in the system 1), the arithmetic of information, and the like. For example, the storage function management part 312 controls the result storage execution part 308 to store the result obtained by executing the arithmetic logic in the object storage 400.

[Processing Flow in System 1]

Figure 4:
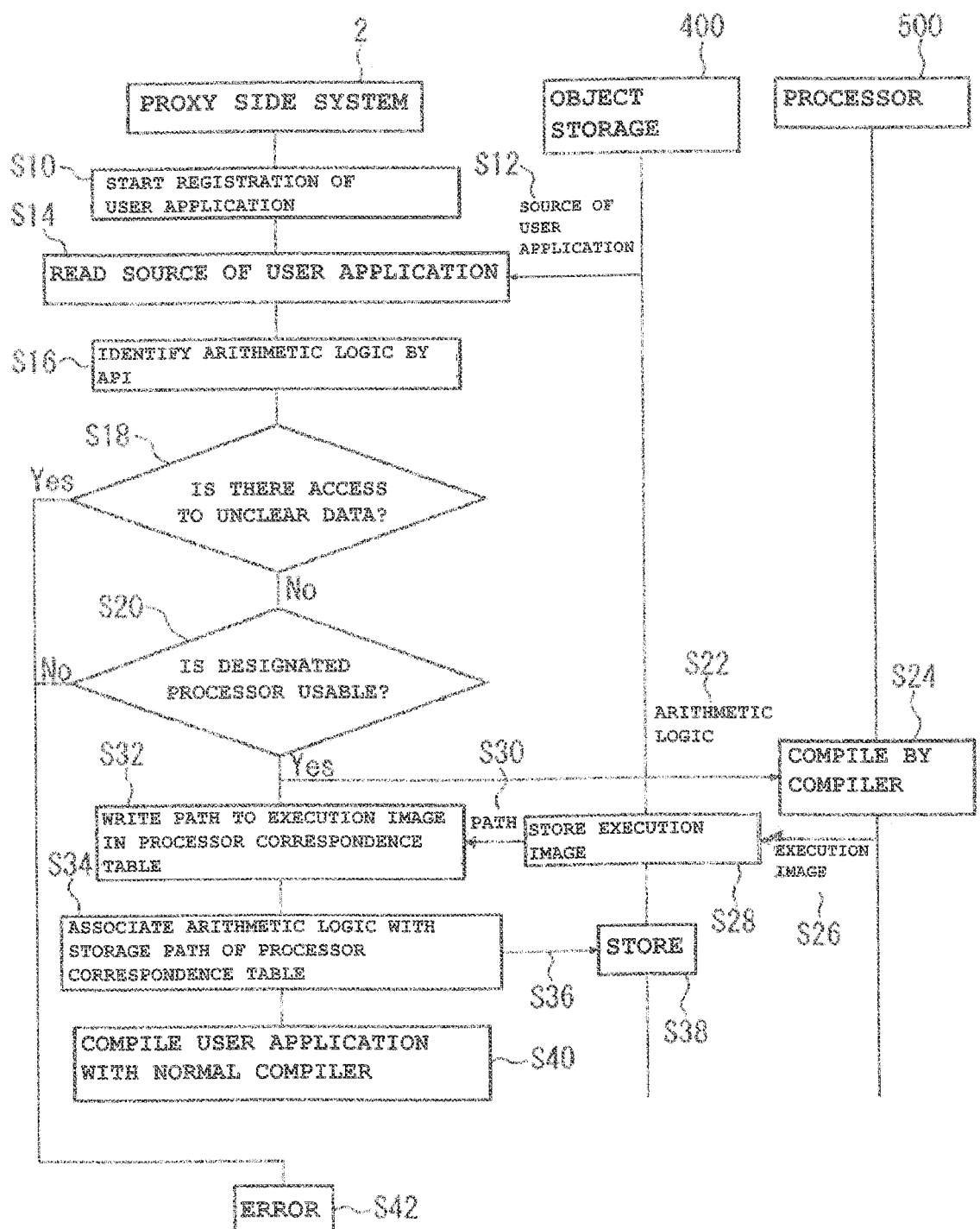
FIG. 4 is a flow chart of processing in the system according to this embodiment.
Figure 5:
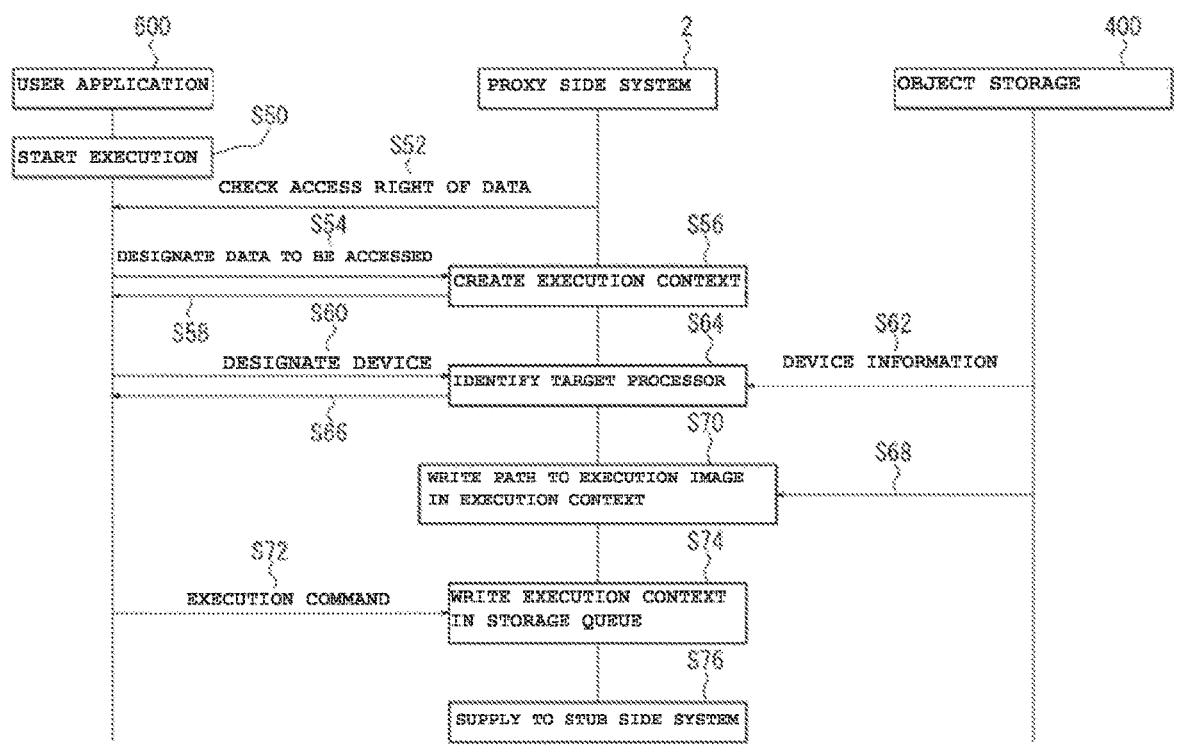
FIG. 5 is a flow chart of processing in the system according to this embodiment.
Figure 6:
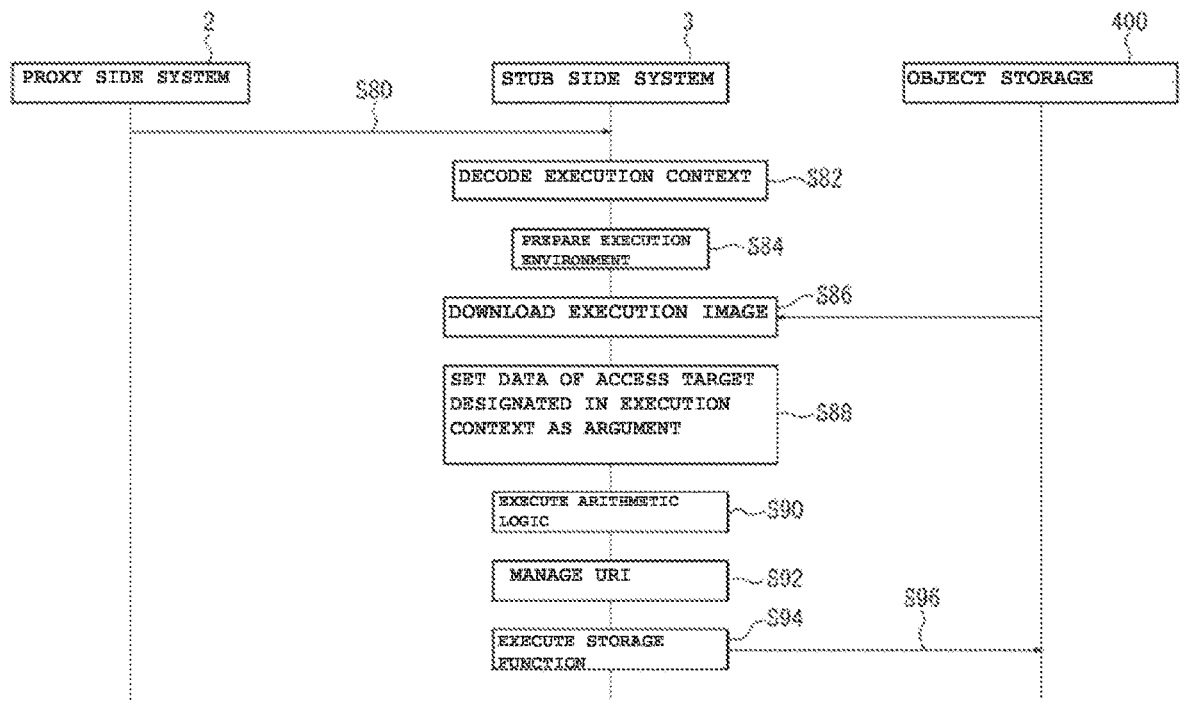
FIG. 6 is a flow chart of processing in the system according to this embodiment.

Each of FIGS. 4 to 6 illustrates an example of an outline of a processing flow in the system according to this embodiment. Specifically, FIG. 4 illustrates a processing flow which enables the system 1 to support a plurality of types of processors. Further, FIG. 5 illustrates the processing flow in the proxy side system 2 in a case where the user application is executed, and FIG. 6 illustrates the processing flow in the stub side system 3 in a case where the user application is executed. Incidentally, in FIGS. 4 to 6, the user application may be referred to as a "user application", and the source code may be referred to as a "source".

First, reference is made to FIG. 4. First, the registration of the user application is started in the proxy side system 2 (step 10) (hereinafter, a step is referred to as "S"). The source acquisition part 200 acquires the source code of the user application 600 stored in the object storage 400 (S12), and reads the source code into the system 1 (S14). Subsequently, the system 1 calls the API used in the system 1 and identifies the arithmetic logic to be subject to distributed processing using the API on the basis of the read source code (S16).

Next, by using the pointer based on the URI, the storage integration management part 206 checks whether or not access to data other than predetermined data from the identified arithmetic logic exists (S18). In a case where it is determined that access to other data exists (Yes in S18), the storage integration management part 206 executes error processing (S42). For example, the storage integration management part 206 stops the execution of the processing of the system 1. On the other hand, in a case where it is determined that no access to other data exists (No in S18), the storage integration management part 206 supplies the device management part 204 with information indicating that no access to other data exists or causes the device management part 204 to continue the execution of the processing.

In a case where it is determined that no access to other data in the storage integration management part 206 exists, the device management part 204 checks whether or not the processor which is designated on the basis of the source code is a usable processor which can be used in the system 1 (S20). That is, the device management part 204 checks whether or not the processor correspondence table and the correspondence relation have already been created for the designated processor. In a case where it is determined that the processor correspondence table and the correspondence relation have not been created, the device management part 204 determines that the designated processor is not usable (No in S20) and executes error processing (S42). The error processing may be the same as above. On the other hand, in a case where it is determined that the processor correspondence table and the correspondence relation have been created (Yes in S20), the device management part 204 causes the arithmetic logic supply part 208 to execute the transmission of the arithmetic logic to the designated processor (S22).

The processor 500 receives the arithmetic logic and causes its own compiler to compile the received arithmetic logic (S24). In a case where a plurality of designated processors exist, the arithmetic logic supply part 208 supplies an arithmetic logic to each of the plurality of processors. Then, in this case, the plurality of processors execute the compilation of the received arithmetic logics by using the respective compilers. Each of one or more processors uses the compilation result as an execution image (S26). Then, each of the one or more processors supplies the execution image to the object storage 400 and stores the execution image in the object storage 400 (S28).

Then, the correspondence table creation part 210 receives a path from the object storage 400 to each execution image for each one or a plurality of processors (S30), creates a processor correspondence table, and writes the path to the execution image in the processor correspondence table (S32). That is, the correspondence table creation part 210 creates a processor correspondence table in which the processor is associated with the path indicating the storage position of the execution image created in the processor in the object storage 400.

Herein, the user application 600 can have a plurality of arithmetic logics. In this case, in the system 1 according to this embodiment, S18 to S32 are executed for each of a plurality of arithmetic logics to create a processor correspondence table. Therefore, in a case where a plurality of arithmetic logics exist, the processor correspondence table is created for each of the plurality of arithmetic logics.

Subsequently, the correspondence relation determination part 212 creates a correspondence relation in which the arithmetic logic supplied by the arithmetic logic supply part 208 is associated with the storage path to the processor correspondence table which is stored in the object storage 400 (S34) and supplies information regarding this correspondence relation together with the processor correspondence table to the object storage 400 (S36). The object storage 400 stores the processor correspondence table and the correspondence relation (S38). Then, the user application 600 is compiled by a conventionally known compiler (S40).

Next, reference is made to FIG. 5. First, the execution of the user application 600 having a predetermined function is started (S50). The user application 600 requests the proxy side system 2 to designate the data to be accessed by the arithmetic logic included in its own source code. The storage integration management part 206 checks whether or not the user application 600 has an access right to the requested data (S52). In a case where the storage integration management part 206 determines that the user application 600 has the access right, the user application 600 designates the data to be accessed by the arithmetic logic (S54). On the other hand, in a case where it is determined that the requested data does not have the access right, the storage integration management part 206 denies the access to the data and ends the processing.

The execution context creation part 214 uses the designated data to create an execution context for the arithmetic logic (S56). In a case where the execution context creation part 214 creates the execution context, the execution context creation part 214 notifies the user application 600 of the information indicating that the execution context is created (S58). In response to this notification, the user application 600 designates the device which executes the arithmetic logic (S60). The device management part 204 acquires information (device information) regarding the device designated by the user application 600 from the object storage 400 (S62). Then, the device management part 204 identifies the target processor which is the processor on which data processing is executed on the basis of the device information (S64).

The device management part 204 supplies the user application 600 with the information indicating that the target processor has been identified (S66). Further, the execution context creation part 214 refers to the processor correspondence table and the correspondence relation stored in the object storage 400 (S68) and writes the path to the execution image associated with the target processor in the processor correspondence table associated with the arithmetic logic in the execution context (S70).

After acquiring the information indicating that the target processor has been identified, the user application 600 supplies the proxy side system 2 with the execution command of the arithmetic logic (S72). After receiving the information, in order to supply an execution context in which the path is written to the stub side system 3, the control part 50 of the proxy side system 2 writes the execution context in the storage queue (S74). Incidentally, the execution context creation part 214 can also include the execution environment information which designates the environment in which the arithmetic logic is executed in the execution context. Then, the transmission processing part 216 supplies various kinds of information in the storage queue to the stub side system 3 (S76).

Next, reference is made to FIG. 6. The reception processing part 300 receives the execution context from the transmission processing part 216 of the proxy side system 2 (S80). The reception processing part 300 decodes the received execution context (S82). The memory management part 302 prepares an execution environment of a physical memory or the like in which arithmetic logic is executed on the basis of the device information in the execution context decoded by the reception processing part 300 and/or the execution environment information (S84). Then, the execution image acquisition part 304 downloads the execution image stored in the object storage 400 on the basis of the path to the execution image in the decoded execution context (S88).

Then, the arithmetic logic execution part 306 sets the data designated in the decoded execution context as an argument (S88) and executes the arithmetic logic by using the execution image downloaded in the execution environment (S90).

Then, the URI management part 310 executes the URI management processing of distributing the access destination of the data (S92). Further, the storage function management part 312 uses the function of the result storage execution part 308 (S94) to store the execution result of the arithmetic logic in the object storage 400 (S96). The execution result is referred to from inside and outside the system 1 as needed. In a case where the system 1 has a local storage, the storage function management part 312 can also store the execution result in the local storage (not illustrated).

Effects of Embodiment

In the system 1 according to this embodiment, the arithmetic logic can be held as the source code, and the execution image previously compiled for the device 5 by the processor 500 of the device 5 can be stored in the object storage 400. That is, the execution image matching each of processors of a plurality of mutually different devices can be stored in the object storage 400 in advance. Then, in the system 1, when the arithmetic logic is called according to the operation of the user application 600, the execution image suitable for the processor 500 of the device 5 designated by the user application 600 is downloaded from the object storage 400 and executed. That is, in the system 1 according to this embodiment, the user application 600 supplies an execution image to the proxy side system 2, the proxy side system 2 supplies the execution image to the storage through the stub side system 3, and data processing can be executed directly on the storage. Accordingly, in the system 1 according to this embodiment, for example, even in a case where a large amount of data is handled which is difficult to divide into a small amount of data in Low Context handled by artificial intelligence (AI), the data processing efficiency can be improved significantly.

Therefore, according to the system 1 according to this embodiment, for example, Low Context Data and a binary large object (BLOB) used in the case of processing moving images of a security camera and recorded environmental sounds which are difficult to process in a conventional load distribution system can be processed efficiently. Incidentally, Low Context Data is difficult to divide into files and requires Scale Up support to increase the size of one process. Thus, a conventional method results in the reduction of data processing efficiency due to the processing speed limited by the memory bandwidth.

In the system 1 according to this embodiment, the stub side system 3 can execute the predetermined processing only by downloading the execution image from the object storage 400, and the size of the execution image can be reduced. Thus, the amount of data transfer can be reduced significantly. Furthermore, the system 1 creates the execution image by using each compiler of a plurality of processors. Thus, compared to conventional Java (registered trademark) or the like which requires time and effort to port, even when a new processor is developed, it is easier to adapt to the new processor.

In the system 1 according to this embodiment, the processing speed can be improved without requiring intermediate code overhead or virtual machines such as conventional Java (registered trademark), and it is possible to handle a plurality of heterogeneous devices and to fully utilize the functions of the hardware.

In the system 1 according to this embodiment, the source code of the user application 600 can be stored in the object storage 400, that is, the cloud, and the source code can be compiled in the cloud as it is. Thus, the source code is not substantially leaked to the outside, and the source code is only compiled into the execution image without requiring complicated processing such as intermediate code so that information security is also excellent.

In the system 1 according to this embodiment, the URI is used as the pointer passed in the plurality of routines instead of the data position (physical address), and thus, the DRAM can be used as a cache having a larger capacity than the cache. That is, in the system 1, it is not always necessary to transfer all of the data used for data processing to the DRAM, and only a part required for data processing of the data stored in the lower storage part of the memory hierarchy such as the SSD can be accessed and processed (partial access). In a case where predetermined data is read from the lower storage part of the memory hierarchy such as the SSD, it is possible to perform processing (stream processing and the like) which incorporates the operations required for data processing.

Therefore, in the conventional management by physical address, the pointer is different for each storage part. However, according to the system 1 according to this embodiment, the same data can be pointed with the same pointer by using the URI, and thus the data in all storage parts can be managed uniformly. Thus, even in a case where the amount of data increases with respect to the transfer rate, data processing that is faster than the conventional address management can be realized by incorporating a technology of accelerating data processing such as partial access and stream processing into various applications. That is, according to the system 1 of this embodiment, it is possible to realize the reduction in wasteful data transfer, the standardization of data transfer routine, and the extension into the data transfer routine.

In the above description, each part of the system 1 may be realized by hardware or may be realized software. Further, the part may be realized by a combination of hardware and software. The program may be installed in the computer configuring the system 1 from a computer-readable medium or a storage device connected to a network.

The program installed in the computer and causing the computer to function as the system 1 according to this embodiment operates the CPU or the like to cause the computer to function as the system 1. The information processing described in the program is read by the computer to function as a specific means in which the software and the hardware resource of the system 1 cooperate. Then, when the processing of information according to the purpose of use of the computer in this embodiment is executed by such a specific means, it is possible to configure a unique system 1 according to the purpose of use.

Further, in an information processing device which includes a data unit having a CPU, a ROM, a RAM, a communication interface and the like, an input unit such as a keyboard, a touch panel and a microphone, an output unit such as a display and a speaker, and a storage unit such as a memory and an HDD, the system 1 may be realized by activating software or a program that defines the operation of each part of the system 1.

The program for the system 1 can be provided in the system 1 via a communication network such as the Internet or a recording medium such as a magnetic recording medium or an optical recording medium. Further, the program for the system 1 stored in the system 1 is executed by the CPU or the like. The recording medium storing the program may be a non-transitory recording medium such as a CD-ROM or a DVD.

Other Examples of Embodiment

The system according to another example of this embodiment can be used as a system of distributed processing across a CPU, GPU, and FPGA for handling a large amount of data without being limited by a communication band.

Specifically, when developing a Speech To Text compatible interphone, the present inventor examined distributed processing in Xeon in the cloud and the embedded processor (Rapsberry Pi3) of IoT without restriction of communication band for remote areas and learned a method of transferring and using OpenCL Kernel files. On the basis of this knowledge, it was found that a system according to another example of this embodiment can be constructed.

First, the background of the system will be described. That is, it is known that a memory hierarchy of which the upper and lower side is speed and of which the left and right side is a capacity in the storage device is deformed into a drum shape according to Moore's law, and the transfer rate in the central portion is insufficient. This is because when the semiconductor process evolves, the upper and lower side of the memory hierarchy become higher (that is, faster), and the base becomes wider (that is, the capacity increases). However, Gilder's law representing the evolution of transfer rate is slower than Moore's law, and the relative speed becomes 1/10 in ten years. Therefore, a chronic shortage of transfer rate occurs.

Herein, as a transfer rate countermeasure, In Storage Processing which performs processing without moving data from the data source as much as possible can be considered. However, no data processing-oriented platform which supports various processors exists, and it is necessary to develop the platform independently by using container technology or the like.

In this regard, in the system according to another example of this embodiment, an aspect is adopted in which a program regarding data access is written in OpenCL, an OpenCL Kernel Image is created in advance according to the device existing in the system, and the Kernel Image corresponding to the device in which the data exists is transferred and executed at the time of data access.

As the language used, for example, OpenCL 1.2 which has abundant support for the target processor can be adopted. Incidentally, in a case where Azure Xeon and Rapsberry Pi3 (VideoCore IV) are used as a development target, OpenCL 1.2 is preferable. Further, the processing may be passed from the cloud to Rapsberry Pi3 by using Docker. However, in the case of using Docker, it may take time to transfer the Docker Image in a remote communication environment, and thus it is preferable to adopt a method of transferring only the OpenCL Kernel. This is because the method of transferring only the OpenCL Kernel is effective in many cases of processing a large amount of data.

Specifically, in high-speed storage such as All Flash Array, a large amount of data is divided into a plurality of inodes and stored. At the time of reading a file, the inodes are aggregated, sorted, and encoded to a file transferable format. If the OpenCL Kernel Image is operated by the processor of the storage device itself, the inode can be operated directly without passing through the above three processes, and the execution efficiency of the entire system can be improved.

FIG. 7($a$) is a schematic diagram of a conventional Apache Spark operation, and FIG. 7($b$) is a schematic diagram of an operation in a system according to another example of this embodiment.

In the conventional method, file reading is started at 1-a, and aggregation and sorting of a plurality of inodes occur at 1-c. Subsequently, encoding into the object storage format is performed at 1-d. On the other hand, in FIG. 7($b$), the processing is passed to the virtual processor in the cloud at 2-a, and the OpenCL Kernel Image is transferred at 2-a-x. Data processing is performed at 3-a ... e without aggregation, sorting, and encoding, and only the result is returned to the cloud at 4-c.

Table 1 shows an estimated time at each step of the processing in FIG. 7.

TABLE 1

| | | Legacy | | | | | Proposal | | |
|---|---|---|---|---|---|---|---|---|---|
| | | Hybrid | | Public | | | Hybrid | | Public |
| 1-a | | 130 ms | 130 | 1 ms | 1 | 1-a | | | |
| 1-b | | 25 µs | 0.025 | 25 µs | 0.025 | 1-b | | | |
| 1-c | | 25 ns × src | 0.0025 | 25 ns × src | 0.0025 | 1-c | | | |
| 1-d | | 130 ms × src | 13000 | 1 ms × src | 100 | 1-d | | | |
| 1-e | | 13.75 ns × src | 0.00138 | 13.75 ns × src | 0.001375 | 1-e | | | |
| 2-a | | 25 µs | 0.025 | 25 µs | 0.025 | 2-a | 25 µs | 0.025 | 25 µs | 0.025 |
| | | | | | | 2-a-x | 25 µs + 130 ms | 130.025 | 25 µstims | 1.025 |
| 3-a ... e | | 13.75 ns × src^2 | 0.1375 | 13.75 ns × src^2 | 0.1375 | 3-a ... e | 25 µs + 25 ns × src + 13.75 ns × src^2 | 0.165 | 25 µs + 25 ns × src + 13.75 ns × src^2 | 0.165 |
| 2-b | | 25 µs | 0.025 | 25 µs | 0.025 | 2-b | 25 µs | 0.025 | 25 µs | 0.025 |
| 4-a | | 13.75 ns | 1.4E−05 | 13.75 ns | 1.38E−05 | 4-a | 13.75 ns | 0.00001375 | 13.75 ns | 0.00001375 |
| 4-b | | 13.75 ns × out | 1.4E−05 | 13.75 ns × out | 1.38E−05 | 4-b | 13.75 ns × out | 0.00001375 | 13.75 ns × out | 0.00001375 |
| | | | | | | 4-b-x | 13.75 ns × out | 0.00001375 | 13.75 ns × out | 0.00001375 |
| 4-c | | 130 ms × out | 130 | 1 ms × out | 1 | 4-c | 130 ms × out + 25 µs × out | 130.025 | 1 ms × out + 25 µs × out | 1.025 |
| 4-d | | 300 µs + 25 ns × out | 0.30003 | 300 µs + 25 ns × out | 0.300025 | 4-d | 13.75 ns × out | 0.00001375 | 13.75 ns × out | 0.00001375 |
| | | | | | | 4-d-x | 13.75 ns × out + 300 µs + 25 ns × out | 0.000025 | 13.75 ns × out + 300 µs + 25 ns × out | 0.000025 |
| | Full total (ms) | | 13280.5 | | 102.5164 | | Full total (ms) | 250.26508 | | 2.26508 |
| | issue > finish (ms) | | 13130.5 | | 101.5164 | | issue > finish (ms) | 260.265055 | | 2.285055 |

Legacy indicates the estimated time in the conventional method, and Proposal is the estimated time in the system according to another example of this embodiment. Hybrid is a case where 100 files of 10 M are exchanged between North American data centers and Japan, and Public is a case where the same number of files are executed under the same LAN. Issue-finish is an actual processing time. While the conventional method takes thirteen seconds in the worst case, the system according to another example of this embodiment is expected to make completion in 260 msec. Most of the processing time is spent on 1-d data transfer, and if there is no data transfer, the conventional method is advantageous as much as there is no OpenCL Kernel Image transfer at 130 msec. However, since data transfer actually exists, the system according to another example of this embodiment is considered to be advantageous in many cases.

Hereinafter, an experimental example of the system according to another example of this embodiment will be described.

In reality, a high-performance GPU is used in the cloud, and a general processor is used at the edge. In this regard, we conducted an experiment in the following environment.

Microsoft Azure
GPGPU in the cloud: nVidia Tesla K80 (5.61 Tflops)
Edge Processor: Intel Skylake 530 (0.44 Tflops)

Table 2 shows a comparison (however, an estimate) of (the processing time of the conventional method)/(the processing time of the system according to another example of this embodiment) in data size×transfer rate.

TABLE 2

| data (Mbyte) | PCIe Gen3 × 32 (32 Gbps) | M2.SSD (3.5 Gbps) | Serial SSD (0.5 Gbps) |
| --- | --- | --- | --- |
| 0.001 | 0.001 | 0.001 | 0.001 |
| 0.01 | 0.010 | 0.010 | 0.010 |
| 0.1 | 0.100 | 0.100 | 0.100 |
| 1 | 0.939 | 0.993 | 0.999 |
| 10 | 5.865 | 9.270 | 9.889 |
| 100 | 12.346 | 55.787 | 89.825 |
| 1000 | 13.880 | 111.970 | 468.692 |
| 10000 | 14.054 | 124.510 | 810.585 |
| 100000 | 14.072 | 125.920 | 874.367 |
| 1000000 | 14.074 | 126.063 | 881.301 |

When a 10 M file×100 was processed in a band environment of 3.5 Gbps, the processing in the conventional method took 30.49 seconds, and the processing in the system according to another example of this embodiment took 3.56 seconds. That is, in the system according to another example of this embodiment, the speed is 8.56 times faster than that of the conventional method. This result did not reach 9.27 times, the theoretical value, but was sufficiently fast.

Incidentally, no data access method exists in OpenCL itself, and the data read by the host application is delivered in the shared memory. Thus, in a case where the system according to another example of this embodiment is used, it is preferable to reorganize the host application for each program. In the above experiment, the host application was rearranged for each data.

There is a technology to read a virtual memory at the time of Page Fault in order to extend the memory space of GPU, and the relevant technology extends GPU memory. Herein, in the system according to another example of this embodiment, the processing is distributed to the reading destination, and thus, it is considered possible to coexist with the relevant technology.

There is a technology called OpenMCCA that maps Heterogeneous Memory such as NVDIMM to virtual memory space and enables unified access. In the system according to another example of this embodiment, a single memory space is not used, but the device name where the file actually exists is acquired in the namespace of the existing storage, and the process is transferred to the device name. In contrast to the scale-up type OpenMCCA, it is considered to be a scale-out type in the system according to another example of this embodiment.

Although the embodiments of the present invention have been described above, the embodiments described above do not limit the scope of the invention according to the claims. Further, it should be noted that not all of the combinations of features described in the embodiments are essential to the means for solving the problems of the invention. Further, the technical elements of the above-described embodiments may be applied independently or may be applied by being divided into a plurality of parts such as a program part and a hardware part.

REFERENCE SIGNS LIST

1 System
2 Proxy side system
3 Stub side system
4 Public PaaS
5 Device
10 Queue
12 Ceph
14 Dedicated bus
16 nVidia GPU
20 SSD Controller
30 NVMe
50 Control part
100 API
200 Source acquisition part
202 Arithmetic logic identification part
204 Device management part
206 Storage integration management part
208 Arithmetic logic supply part
210 Correspondence table creation part
212 Correspondence relation determination part
214 Execution context creation part
216 Transmission processing part
300 Reception processing part
302 Memory management part
304 Execution image acquisition part
306 Arithmetic logic execution part
308 Result storage execution part
310 URI management part
312 Storage function management part
400 Object storage
410 GPGPU SaaS
500 Processor
600 User application
610 Processor correspondence table
620 Correspondence relation

The invention claimed is:

1. A system which includes a user application stored in an object storage and having a predetermined arithmetic logic in a source code and enables predetermined processing to be performed on predetermined data by causing at least one heterogeneous device of a plurality of heterogeneous devices to execute the predetermined arithmetic logic, the system comprising:

a source acquisition part that acquires the source code;

an arithmetic logic identification part that identifies the predetermined arithmetic logic from the source code by using a predetermined application programming interface (API);

an arithmetic logic supply part that supplies the predetermined arithmetic logic to a compiler of a processor designated on the basis of the source code;

a correspondence table creation part that, when the object storage stores a result obtained by compiling of the compiler of the designated processor as an execution image, creates a processor correspondence table in which a path to the execution image, which is stored in the object storage, in the designated processor is associated with the designated processor and stores the processor correspondence table in the object storage; and a correspondence relation determination part that stores a correspondence relation, in which the predetermined arithmetic logic supplied by the arithmetic logic supply part is associated with a storage path of the processor correspondence table stored in the object storage, in the object storage.

2. The system according to claim 1, further comprising:
a device management part that checks whether or not the processor designated on the basis of the source code is a usable processor which is usable in the system, wherein in a case where the device management part confirms that the usable processor exists, the arithmetic logic supply part supplies the predetermined arithmetic logic to the usable processor.

3. The system according to claim 2, further comprising:
a storage integration management part that checks whether or not access to data other than the predetermined data from the identified arithmetic logic exists, wherein in a case where it is determined that the access to the data other than the predetermined data from the identified arithmetic logic does not exist in the storage integration management part, the device management part checks whether or not the processor designated on the basis of the source code is a usable processor which is usable in the system.

4. The system according to claim 1, wherein
the plurality of processors are designated on the basis of the source code, and the arithmetic logic supply part supplies the predetermined arithmetic logic to each compiler of the plurality of designated processors.

5. The system according to claim 1, further comprising:
a control part, wherein
the object storage stores the predetermined data on the basis of a data position of the predetermined data, the system uses a Uniform Resource Identifier (URI) in which a predetermined scheme is associated with a resource in a format defined for each scheme after a predetermined delimiter as a pointer to access the predetermined data instead of the data position of the predetermined data, the control part controls and activates an application designated by the predetermined scheme associated with the URI and passes the resource of the URI to the application, and the application uses the URI as the data position of the predetermined data on the basis of the resource of the URI and controls data designated by the URI and stored in the object storage.

6. The system according to claim 2, wherein
the object storage stores device information regarding the plurality of heterogeneous devices, in a case where execution of the user application starts, the user application designates data to be accessed by the predetermined arithmetic logic of the user application and designates a device on which the predetermined arithmetic logic is executed, the system further comprising:

an execution context creation part that creates an execution context to be executed in the predetermined arithmetic logic on the basis of the designated data, wherein the device management part acquires the device information regarding the device designated by the user application from the object storage and identifies a target processor on which data processing is executed, and the execution context creation part refers to the processor correspondence table and the correspondence relation and writes the path to the execution image associated with the target processor in the processor correspondence table associated with the predetermined arithmetic logic in the execution context.

7. The system according to claim 6, further comprising:
a transmission processing part that, in a case where the user application instructs execution of the predetermined arithmetic logic, writes the execution context in which the path to the execution image associated with the target processor is written in a storage queue in order to supply the execution context to an outside system.

8. The system according to claim 7, further comprising:
a reception processing part that receives the execution context in which the path to the execution image associated with the target processor is written from the transmission processing part and decodes the execution context;

a memory management part that prepares an execution environment in which the predetermined arithmetic logic is executed on the basis of the device information in the decoded execution context;

an execution image acquisition part that acquires the execution image from the object storage on the basis of the path to the execution image associated with the target processor in the decoded execution context; and an arithmetic logic execution part that sets the designated data in the decoded execution context as an argument and executes the predetermined arithmetic logic by using the execution image in the execution environment.

9. The system according to claim 8, further comprising:
a result storage execution part that stores a result obtained by executing the predetermined arithmetic logic in the arithmetic logic execution part in the object storage.

10. The system according to claim 1, wherein
the predetermined arithmetic logic is used for distributed processing.

11. An information processing method of a system which includes a user application stored in an object storage and having a predetermined arithmetic logic in a source code and enables predetermined processing to be performed on predetermined data by causing at least one heterogeneous device of a plurality of heterogeneous devices to execute the predetermined arithmetic logic, the method comprising:

a source acquisition step of acquiring the source code;

an arithmetic logic identification step of identifying the predetermined arithmetic logic from the source code by using a predetermined application programming interface (API);

an arithmetic logic supply step of supplying the predetermined arithmetic logic to a compiler of a processor designated on the basis of the source code;

a correspondence table creation step of, when the object storage stores a result obtained by compiling of the compiler of the designated processor as an execution image, creating a processor correspondence table in which a path to the execution image, which is stored in the object storage, in the designated processor is associated with the designated processor and storing the processor correspondence table in the object storage; and a correspondence relation determination step of storing a correspondence relation, in which the predetermined arithmetic logic supplied in the arithmetic logic supply step is associated with a storage path of the processor correspondence table stored in the object storage, in the object storage.

12. A program for a system which includes a user application stored in an object storage and having a predetermined arithmetic logic in a source code and enables predetermined processing to be performed on predetermined data by causing at least one heterogeneous device of a plurality of heterogeneous devices to execute the predetermined arithmetic logic, the program stored in a non-transitory computer-readable medium causing a computer to execute:

a source acquisition function of acquiring the source code;

an arithmetic logic identification function of identifying the predetermined arithmetic logic from the source code by using a predetermined application programming interface (API);

an arithmetic logic supply function of supplying the predetermined arithmetic logic to a compiler of a processor designated on the basis of the source code;

a correspondence table creation function of, when the object storage stores a result obtained by compiling of the compiler of the designated processor as an execution image, creating a processor correspondence table in which a path to the execution image, which is stored in the object storage, in the designated processor is associated with the designated processor and storing the processor correspondence table in the object storage; and a correspondence relation determination function of storing a correspondence relation, in which the predetermined arithmetic logic supplied by the arithmetic logic supply function is associated with a storage path of the processor correspondence table stored in the object storage, in the object storage.

* * * * *